United States Patent [19]
Blom

[11] Patent Number: 5,183,438
[45] Date of Patent: Feb. 2, 1993

[54] SPORTS FLOOR

[75] Inventor: Jan Blom, Ede, Netherlands

[73] Assignee: Hollandsche Beton Groep Nov., Netherlands

[21] Appl. No.: 686,559

[22] Filed: Apr. 17, 1991

[30] Foreign Application Priority Data

Apr. 19, 1990 [NL] Netherlands ............... 9000933

[51] Int. Cl.$^5$ ............................... E04F 15/16
[52] U.S. Cl. .................... 472/92; 472/94; 428/17; 428/95
[58] Field of Search ............ 472/92, 94; 428/17, 428/87, 95, 131, 331; 52/177, 408

[56] References Cited

U.S. PATENT DOCUMENTS

| | | | |
|---|---|---|---|
| 3,446,122 | 5/1969 | Raichle et al. | 472/92 |
| 3,661,687 | 5/1972 | Spinney et al. | 472/92 X |
| 4,044,179 | 8/1977 | Hass, Jr. | 428/17 |

FOREIGN PATENT DOCUMENTS

| | | |
|---|---|---|
| 2151174 | 4/1972 | Fed. Rep. of Germany . |
| 2658730 | 6/1978 | Fed. Rep. of Germany . |
| 2909944 | 9/1980 | Fed. Rep. of Germany . |
| 2066068 | 8/1971 | France . |

Primary Examiner—Richard E. Chilcot, Jr.
Attorney, Agent, or Firm—Sughrue, Mion, Zinn, Macpeak & Seas

[57] ABSTRACT

A general-purpose sports floor is installed on a supporting substructure composed of stone-like materials or other compositions of materials such as a wooden floor or stabilized sand. In order that the sports floor meets the highest requirements with respect to sports serviceability, lowest risk of injury to the sportsman or sportswoman, mechanical strength and durability it is composed at least of a combination of the following layers or composite layers:

1. at least one relatively thin polyurethane top layer with a covering producing friction for the sportsman or sportswoman;
2. at least one hard elastic layer formed from granules or rubber particles and air cavities present between said particles;
3. at least one relatively thin force-distributing hard layer made, for example, of plywood or hard plastic;
4. at least one relatively thick layer made of plastic foam.

22 Claims, 2 Drawing Sheets

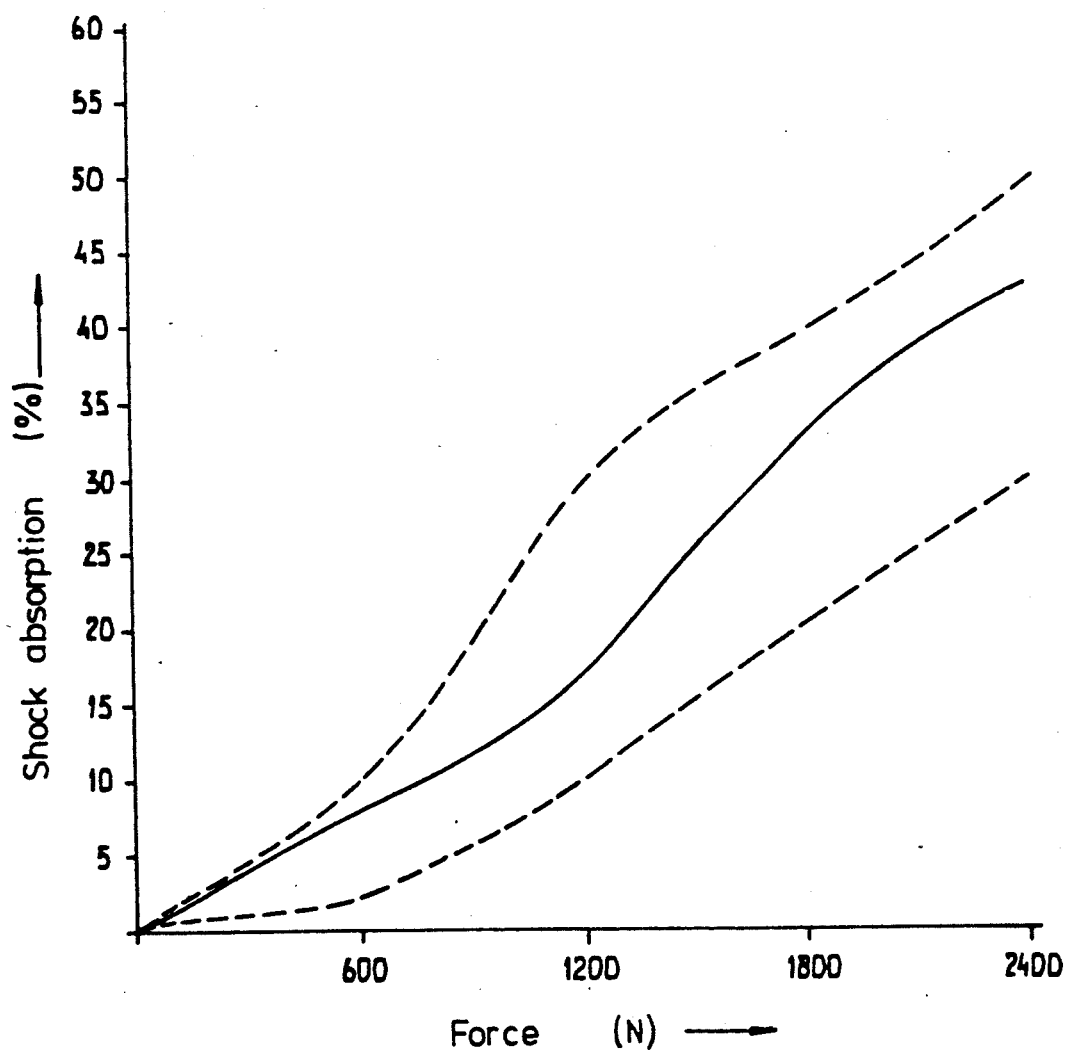

SPORTS FLOOR

The invention relates to a general-purpose sports floor to be installed on a supporting substructure. The substructure may be composed of stone-like materials such as concrete, anhydrite, asphalt or other compositions of materials which offer adequate strength, such as a wooden floor or stabilised sand.

General-purpose sports floors are suitable, for example, for playing, for example, volleyball, basketball, handball, korfball, indoor football, indoor hockey or badminton or practising gymnastics thereon.

According to standards of the Dutch Sport Federation (DSF), general-purpose indoor sports floors are divided into three different categories. The category 1 sports floor has to meet the highest requirements, inter alia with respect to shock absorption, running comfort, friction generated by the surface, static and dynamic mechanical strength, durability under continuous load, resistance to wear, resistance to climatological factors and ball behaviour. In particular, the floor must not feel either too hard or too soft, it must offer adequate friction for sports shoes both in the dry and wet state, lateral takeoff must not be impeded and the damping, i.e. the reduction in the impact force, must become higher, the higher the speed at which the sportsman or sportswoman strikes the floor. Moreover, the floor must not, or virtually not, continue to vibrate after an impact and the sportsman or sportswoman must not feel the floor give under his or her feet during normal running. The German DIN Standard 18 032 also specifies requirements imposed on indoor sports floors.

The object of the invention is to provide a sports floor which meets the standards of a general-purpose indoor sports floor of category 1 of the Dutch Sports Federation (code NSF-US1-1).

Said sports floor must meet the highest requirements with respect to sports serviceability, lowest risk of injury to the sportsman or sportswoman, mechanical strength and durability.

According to the invention, a sports floor, viewed from top to bottom, must, for this purpose, be composed at least of a combination of the following layers or composite layers:
1. at least one relatively thin polyurethane top layer with a covering producing friction for the sportsman or sportswoman;
2. at least one hard elastic layer formed from granules of rubber particles and air cavities present between said particles;
3. at least one relatively thin force-distributing hard layer made, for example, of plywood or hard plastic;
4. at least one relatively thick layer made of plastic foam.

Very good results with respect to shock absorption are achieved if the top layer is composed of two polyurethane layers each having a thickness of 1 mm and a density of 1340 kg/m$^3$, if the layer of rubber granules has a thickness of approximately 9 mm, a modulus of elasticity of 21 MPa and a density of 870 kg/m$^3$, if the force-distributing layer is composed of two layers of waterproof plywood mutually bonded by flexible polyurethane glue and each having a thickness of approximately 6 mm and if the foam layer is composed of one or more layers of identical or different density and has a thickness of approximately 30 mm.

Further limits and preferred values of parameters of the different layers follow from the description and subordinate claims.

In order to be able to match the degree of shock absorption of the sports floor to the sport to be practised, the plastic foam may be packaged in airtight plastic bags which are connected to one another and/or to a pressure vessel and/or to a pump via one or more hoses, valves which can be operated being installed in the bags and/or the connecting hoses in order to be able to bring about and or to be able to eliminate the pressure differences in a particular manner, for example, inter alia, depending on the sport to be practised on the sports floor.

The invention will now be explained in more detail with reference to the figures.

FIG. 2 shows a graph in which the percentage of damping is plotted against a force exerted on the sports floor.

Figure 1:
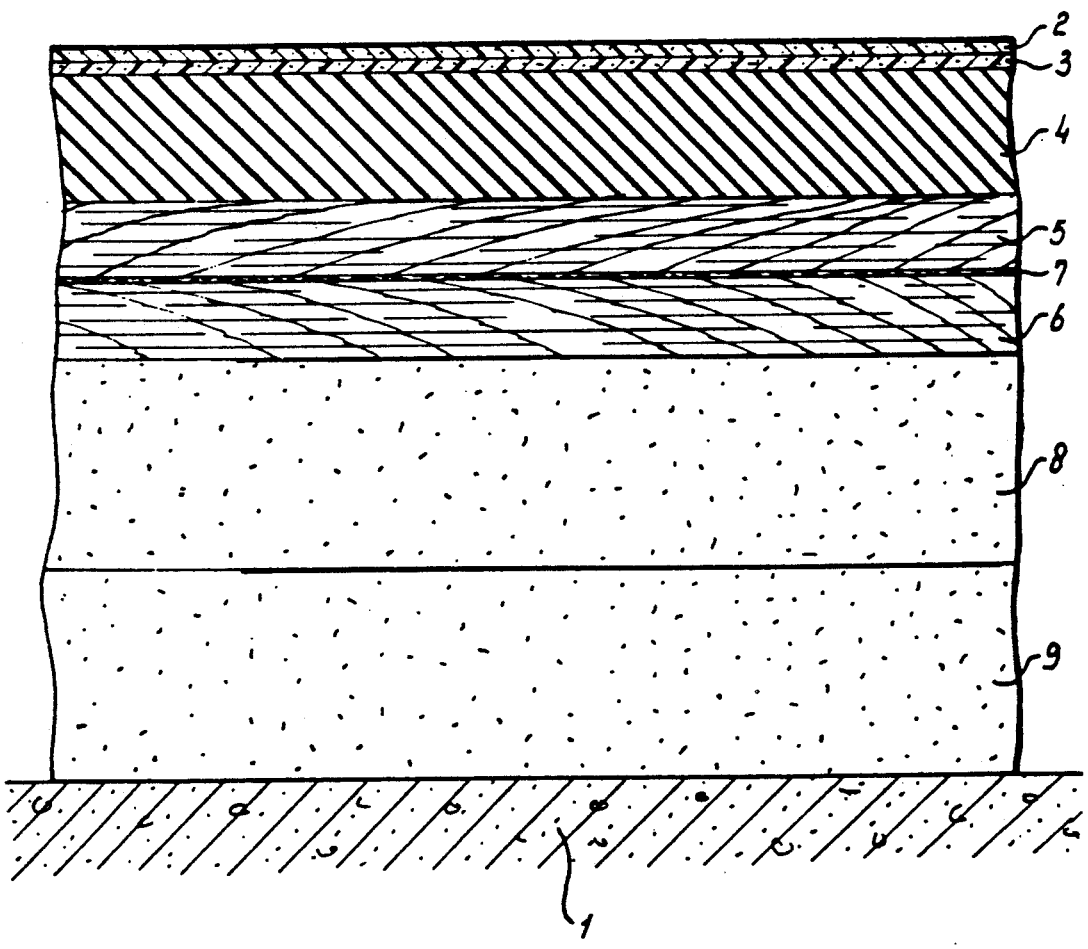
FIG. 1 shows a section of a preferred embodiment of a sports floor according to the invention.

The sports floor shown in FIG. 1 is installed on a concrete floor 1 and is composed, viewed from top to bottom, of the following layers:

- a layer 2 approximately 1 mm thick and composed of polyurethane having a density of 1350 kg/m$^3$ and having a polyurethane finishing layer which brings about the generated friction needed for the sportsman or sportswoman under moist conditions, for example due to shed droplets of sweat, and dry conditions;
- a layer 3 approximately 1 mm thick composed of polyurethane and having a density of approximately 1350 kg/m$^3$;
- a hard elastic layer 4 composed or granules or rubber particles bonded to one another by polyurethane glue, which layer has a thickness of approximately 9 mm; there are air cavities between the particles; the density is approximately 870 kg/m$^3$ and the modulus of elasticity approximately 21 MPa; the top of said layer is generally provided with a surface-filling layer;
- a force-distributing hard layer 5 composed of waterproof plywood having a thickness of approximately 6 mm and a modulus of elasticity of 4300 MPa;
- a very thin layer of flexible polyurethane glue (7);
- a force-distributing hard layer 6 composed of waterproof plywood having a thickness of approximately 6 mm and a modulus of elasticity of 4300 MPa, the layers 5 and 6 being composed of panels which are offset with respect to one another so that the force distribution is also optimum in the case of connecting seams;
- a layer 8 composed of polyurethane-bonded polyether foam having a thickness of 15 mm and a density of 120 kg/m$^3$;
- a layer 9 composed or polyurethane-bonded polyether foam having a thickness of 15 mm and a density of 80 kg/m$^3$.

Said sports floor meets the standards of the Dutch Sports Federation for a general-purpose sports floor of category 1.

The following tables give an impression of the properties of the sports floor described above.

TABLE 1

| SURFACE HARDNESS | | |
|---|---|---|
| | Result | Assessment |
| +10° C. | 82° | very good |

TABLE 1-continued
SURFACE HARDNESS

| | Result | Assessment |
|---|---|---|
| +20° C. | 80° | very good |
| +50° C. | 78° | very good |
| +20° C. after ageing | 81° | very good |

TABLE 2
DSF SPORTS FLOOR TESTER DYNAMIC

| +20° C. | Damping capacity | Assessment | N.A. Resilience | N.A. Assessment |
|---|---|---|---|---|
| Load 600 N | 8% | good | % | |
| Load 1200 N | 17% | good | % | |
| Load 1800 N | 33% | good | % | |
| Load 2400 N | 43% | good | % | |

N.A. = not applicable
Notes: the floor has a good damping capacity.

TABLE 3
MODULI OF RIGIDITY (characterisation)
(Relationship between stress and strain)

| | Stress swing (0.1 N/mm$^2$) | Modulus of ridigity (0.1 N/mm$^2$/mm) Result | Assessment |
|---|---|---|---|
| +10° C. | 0-5 | 1.7 | good |
| | 5-10 | 1.3 | good |
| | 10-20 | 1.4 | good |
| | 20-40 | 2.4 | good |
| +20° C. | 0-5 | 1.7 | good |
| | 5-10 | 1.3 | good |
| | 10-20 | 1.4 | good |
| | 20-40 | 2.4 | good |
| +50° C. | 0-5 | 1.1 | good |
| | 5-10 | 1.1 | good |
| | 10-20 | 1.3 | good |
| | 20-40 | 2.3 | good |
| +20° C. after ageing | 0-5 | 1.5 | good |
| | 5-10 | 1.2 | good |
| | 10-20 | 1.4 | good |
| | 20-40 | 2.6 | good |

TABLE 4
MODULUS OF CREEP (characterisation)
(Change in deformation (strain) per unit time; pressure is constant)

| | seconds | Modulus of creep (10$^{-3}$ mm/sec) pressure = 1 N/mm$^2$ result | assessment | pressure = 4 N/mm$^2$ result | assessment |
|---|---|---|---|---|---|
| +20° C. | 0-15 | 71.3 | good | 70.7 | good |
| | 15-200 | 6.7 | good | 6.8 | good |
| -15° C. | 0-15 | 68.0 | good | 101.3 | good |
| | 15-200 | 9.6 | good | 9.9 | good |
| +50° C. | 0-15 | 70.7 | good | 62.7 | good |
| | 15-200 | 9.6 | good | 6.0 | good |
| +20° C. after ageing | 0-15 | 55.3 | good | 76.0 | good |
| | 15-200 | 5.1 | good | 7.6 | good |

TABLE 5
COEFFICIENT OF FRICTION

| | Dry Result | Assessment | Moist Result | Wet Result | Assessment |
|---|---|---|---|---|---|
| +20° C. | 0.75 | high | 0.48 | 0.40 | low |
| +50° C. | 0.76 | high | 0.49 | 0.42 | low |
| +20° C. after ageing | 0.74 | high | 0.48 | 0.40 | low |

TABLE 6
SLIDING CAPACITY of person in sports clothing

| | Dry Result | Assessment | Wet Result | Assessment |
|---|---|---|---|---|
| +20° C. | 0.27 | good | 0.18 | very good |
| +20° C. after ageing | 0.26 | good | 0.18 | very good |

TABLE 7
BALL BOUNCING CAPACITY

| | Result | Assessment |
|---|---|---|
| +20° C. | 1.32 m | good |
| +20° C. after ageing | 1.35 m | good |

TABLE 8
CONTINUOUS LOADING

| | Durability | Assessment |
|---|---|---|
| +20° C. | ≧21 days | very good |
| +20° C. after ageing | ≧21 days | very good |

TABLE 9
RESISTANCE TO MECHANICAL WEAR
V = volumetric loss  G = weight loss (%)

| | +20° C. | | | | +20° C. after ageing | | | |
|---|---|---|---|---|---|---|---|---|
| | Result | | Assessment | | Result | | Assessment | |
| No. of revolutions | V | G | V | G | V | G | V | G |
| 100 | | | | | | | | |
| 200 | | | | | | | | |
| 300 | | | | | | | | |
| 500 | 6.1 | 2.9 | good | good | 7.3 | 3.2 | good | good |
| 1000 | 10.3 | 6.0 | good | good | 12.1 | 6.8 | good | good |

TABLE 10
COMPRESSIVE STRENGTH (STATIC)

| | Result | Assessment |
|---|---|---|
| +20° C. | ≧6 N/mm$^2$ | good |
| -15° C. | ≧6 N/mm$^2$ | good |
| +50° C. | ≧6 N/mm$^2$ | good |
| +20° C. after ageing | ≧6 N/mm$^2$ | good |

TABLE 11
IMPACT STRENGTH (DYNAMIC)
DSF IMPACT TESTER

| | Strength at 90° Result | Assessment | Strength at 65° Result | Assessment |
|---|---|---|---|---|
| +20° C. | ≧16.8 Nm' | v. good | ≧8.5 Nm' | v. good |
| +10° C. | ≧16.8 Nm' | v. good | ≧8.5 Nm' | v. good |
| -15° C. | ≧16.8 Nm' | v. good | ≧8.5 Nm' | v. good |
| +20° C. after ageing | ≧16.8 Nm' | v. good | ≧8.5 Nm' | v. good |

TABLE 12
BALL DROP TEST

| | Assessment |
|---|---|
| +20° C. | good |
| +10° C. | good |
| −15° C. | good |
| +20° C. after ageing | good |

TABLE 13
SUSCEPTIBILITY TO VIBRATION

| | Result | Assessment |
|---|---|---|
| +20° C. | ≦1 mm | good |
| +20° C. after ageing | ≦1 mm | good |

FIRE RESISTANCE
Low flammability

The running comfort, the shock absorption, the static and dynamic strength and the durability under continuous loading of the sports floor according to the invention were assessed as very good.

FIG. 2 shows graphically the shock absorption, specified as damping capacity in DSF reports, in % plotted against the force exerted. The region between the broken lines is the region within which the percentage of shock absorption of category 1 floors must fall.

In order to achieve adequate results, the following limits are specified:
layer of rubber granules 4: thickness 4 to 14 mm and density 500 to 1000 kg/m$^3$.
Force-distributing layer 5, 6, 7: thickness 6 to 20 mm and density 350 to 800 kg/m$^3$, preferably 490 to 535 kg/m$^3$. Foam layer 8, 9: thickness 12 to 50 mm and density 30 to 200 kg/m$^3$.

The foam layers 8, 9 may be packed in airtight plastic bags which are connected via one or more hoses to a pressure vessel or pump. The bags may be mutually connected. By bringing the bags to a particular pressure, the shock absorption provided by the floor can be matched to the type of sport. Pressure differences can be achieved or eliminated in a particular manner, which is dependent, inter alia, on the sport to be practised, by means of valves in the bags and/or the hoses.

The sports floor according to the invention has, inter alia, the following advantages:
the floor does not feel too hard but the sportsman or sportswoman does not have the feeling of sinking into the top layer.
the floor can provide the sportsman or sportswoman with adequate friction, both in the dry and in the moist state.
lateral take-off is not impeded.
during descent after a jump, the floor feels such that the impact is absorbed as well as possible; the higher the speed at which the sportsman or sportswoman strikes the floor, the greater is the reduction of the impact force, the term reduction of the impact force being synonymous with damping in sports circles.
the shock absorption or, alternatively, the reduction of the impact force must be such that the movement of the sportsman or sportswoman, for example during jumping, is not deadened, but such that speed always continues to exist in the sport and that the forces exerted on the sportsman or sportswoman can be kept as low as possible.
if a sportsman or sportswoman jumps on a floor, the after-vibration will hardly be capable of being felt by another sportsman or sportswoman.

I claim:
1. Sports floor to be installed on a cohesive substructure or one composed of a sandy structure, wherein said sports floor, viewed from top to bottom, is composed at least of the combination of the following layers or composite layers:
   a) at least one relatively thin polyurethane top layer having a covering which has specific frictional properties;
   b) at least one hard elastic layer formed from granules of rubber particles and air cavities present between said particles;
   c) at least one relatively thin force-distributing hard layer made, for example, of plywood or hard plastic; and
   d) at least one relatively thick layer made of plastic foam.
2. Sports floor according to claim 1, wherein the polyurethane in the top layer has a density of between 1000 and 2500 kg/m$^3$.
3. Sports floor according to claim 1 or 2, wherein the top layer comprises a hardened liquid disposed on the hard elastic layer.
4. Sports floor according to claim 1, wherein the polyurethane top layer is composed of two layers approximately 1 mm thick.
5. Sports floor according to claim 1, wherein the layer of rubber granules has a thickness of between 4 and 14 mm and a density of between 500 and 1000 kg/m$^3$.
6. Sports floor according to claim 5, wherein the modulus of elasticity of the layer of rubber granules is approximately 21 MPa and the density approximately 870 kg/m$^3$.
7. Sports floor according to either claim 5 or 6, wherein the layer of rubber granules has a thickness of approximately 9 mm.
8. Sports floor according to claims 5 or 6, further comprising a polyurethane glue for binding the rubber particles of the layer of rubber granules to one another.
9. Sports floor according to claims 5 or 6, further comprising a surface-filling layer on top of the layer of rubber granules.
10. Sports floor according to claim 1, wherein the force-distributing hard layer is composed of two layers of waterproof plywood glued to one another in an offset manner.
11. Sports floor according to claim 1, wherein the force-distributing hard layer is composed of two layers of plastic glued to one another in an offset manner.
12. Sports floor according to claim 1, wherein the force-distributing hard layer is composed of a plastic layer.
13. Sports floor according to claim 11 or 12, wherein the thickness of the force-distributing layer is between 6 and 20 mm.
14. Sports floor according to claims 10, 11 or 12, wherein the modulus of elasticity of the force-distributing layer is approximately 4300 MPa.
15. Sports floor according to claim 14, wherein the density of the force-distributing layer is between 350 and 800 kg/m$^3$.

16. Sports floor according to claim 15, wherein the density of the force-distributing layer is between 490 and 535 kg/m$^3$.

17. Sports floor according to claim 1, wherein the thickness of the foam layer is 12 to 50 mm.

18. Sports floor according to claim 17, wherein the density of the foam layer is 30 to 200 kg/m$^3$.

19. Sports floor according to either claim 17 or 18, wherein the foam layer is composed of two layers of polyurethane foam, of which one has a thickness of approximately 15 mm and a density of approximately 120 kg/m$^3$ and the other has a thickness of approximately 15 mm and a density of approximately 80 kg/m$^3$.

20. Sports floor according to claim 1, further comprising an assembly of layers which, viewed from top to bottom, is composed of a force-distributing hard layer having a thickness of 3 to 20 mm and a foam layer having a thickness of 12 to 50 mm, said assembly being disposed beneath said four layers.

21. Sports floor according to claim 1, wherein the plastic foam is packaged in airtight plastic bags which are mutually connected to one another and to one of a pressure vessel, and a pump via hose means.

22. Sports floor according to claim 21, wherein valves which can be operated are installed in one of the bags and the hose means.

* * * * *